May 29, 1956 K. L. BRIMHALL 2,747,308

BOWL AND APRON ADJUSTMENT FOR DOUBLE FRAME CARRY TYPE SCOOP

Filed Dec. 27, 1949 8 Sheets-Sheet 1

INVENTOR,
Kirk L. Brimhall
BY Chas. J. Chuma
AGENT.

May 29, 1956 K. L. BRIMHALL 2,747,308

BOWL AND APRON ADJUSTMENT FOR DOUBLE FRAME CARRY TYPE SCOOP

Filed Dec. 27, 1949 8 Sheets-Sheet 2

INVENTOR,
Kirk L. Brimhall

BY [signature]

AGENT.

May 29, 1956 K. L. BRIMHALL 2,747,308

BOWL AND APRON ADJUSTMENT FOR DOUBLE FRAME CARRY TYPE SCOOP

Filed Dec. 27, 1949 8 Sheets-Sheet 3

INVENTOR,
Kirk L. Brimhall

BY Chas. J. Chunn

AGENT.

INVENTOR,
Kirk L. Brimhall
BY [signature]
AGENT.

INVENTOR,
Kirk L. Brimhall
BY [signature]
AGENT

INVENTOR,
Kirk L. Brimhall
BY Chas. J. Shunn
AGENT.

INVENTOR,
Kirk L. Brimhall
BY Chas. J. Chem
AGENT.

May 29, 1956 K. L. BRIMHALL 2,747,308

BOWL AND APRON ADJUSTMENT FOR DOUBLE FRAME CARRY TYPE SCOOP

Filed Dec. 27, 1949 8 Sheets-Sheet 8

INVENTOR,
Kirk L. Brimhall

BY Chas. J. [signature]

AGENT.

United States Patent Office 2,747,308

Patented May 29, 1956

2,747,308

BOWL AND APRON ADJUSTMENT FOR DOUBLE FRAME CARRY TYPE SCOOP

Kirk L. Brimhall, Torrance, Calif., assignor, by mesne assignments, to Western Equipment Mfg. Co., Glendale, Calif., a corporation of California Application December 27, 1949, Serial No. 135,205

8 Claims. (Cl. 37—129)

This invention relates to hauling scrapers of the sectional frame type including a tiltable bowl and an apron which opens and closes the bowl responsive to relative movement of sections of the frame.

In certain scrapers of this type as heretofore made, several objections are occasioned in the operation thereof. One of these objections is that at the start of the loading operation and during such operation, the apron is not raised to such height as to fully open the bowl and as a result, some of the dirt is rolled in front of the apron instead of being scooped into the bowl.

Another objection is that when the bowl is raised from loading position to a load-carrying position, the apron does not close in properly timed relation to such movement of the bowl and as a result, an appreciable amount of the load will drop between the bowl and the apron before the apron reaches a position closing the bowl.

Another objection occasioned in these scrapers, is that the sectional frame construction frequently lacks the rigidity and strength to avoid damaging relative lateral movement of the sections thereof when making turns while loading the bowl.

A further objection in these scrapers is that the means which responds to relative movement of the frame sections for operating the apron is usually exposed to the dirt and lacks such rigidity and strength as is desirable, with the result that such means is subject to damage or impairment which renders it unreliable in operation.

In consideration of these objections it is one purpose of the present invention to provide a hauling scraper which eliminates said objections, is more rugged and durable and subject to a more reliable and efficient operation.

Another purpose of the invention is to provide apron-operating means for scrapers such as described, which includes a raising and lowering means associated with the frame sections, a lever having a fulcrum on one of the frame sections, and means linking the lever to the apron and to an appropriate part of the scraper frame; with these elements so arranged and combined that as relative movement of the frame sections is effected by means of said raising and lowering means, the apron will quickly be disposed in proper bowl-closing and proper bowl-opening positions for preventing the aforesaid load loss and the objectionable rolling of the dirt in front of the apron.

This invention further resides in the provision of a hauling scraper in which the parts and elements thereof are constructed and arranged to make it easier for the tractor operator to control the operation of the scraper with an accuracy and nicety beyond that heretofore provided for.

Another purpose of this invention is to provide a hauling scraper wherein the sectional frame which includes a draft section or frame and a bowl-carrying section or frame pivotally connected to the draft frame to afford relative movement of said sections or frames for operating the bowl and its associated elements, are so related and arranged that relative lateral displacement of the frames and consequent damage or impairment thereof and of the elements associated therewith are prevented in making sharp turns while loading the bowl.

A further purpose of this invention is the provision of a scraper wherein the two frames or sections are relatively movable by means of a hydraulic cylinder which has a mounting and housing means therefor and elements associated therewith and responsive thereto for effecting the operation of the apron; and wherein these parts are constructed and related to form an upright, compact and sturdy structural unit located at the free ends of said frames for reinforcing and stabilizing the sectional frame as a whole, assisting in preventing relative lateral displacement of the frames and enclosing and protecting the hydraulic cylinder and parts directly associated therewith.

Another purpose of this invention is to provide a scraper such as described, which readily lends itself for use as a scarifying implement, in that in its several forms, provision is made for attaching scarifying teeth to one of the relatively movable frames whereby the teeth may be raised and lowered and used at the same time the bowl is operated to load or spread, or used independently of use of the bowl, and wherein the use of the teeth while loading or spreading prevents sidewise sliding of the scraper on ground which slopes across the line of travel of the scraper.

Yet another purpose hereof is to provide as one form of this invention a scraper wherein the bowl-carrying frame is located within the confines of the draft frame in such manner that the scraper is strengthened appreciably and lateral movement of one frame relative to the other is positively prevented.

With the foregoing and other objects in view, this invention consists in the combination, relative arrangement and interrelation of parts, elements and features which will be described in the following specification and finally defined in the claims hereto appended, it being understood that the apparatus of this invention is subject to modification within the scope of said claims.

Figure 1:
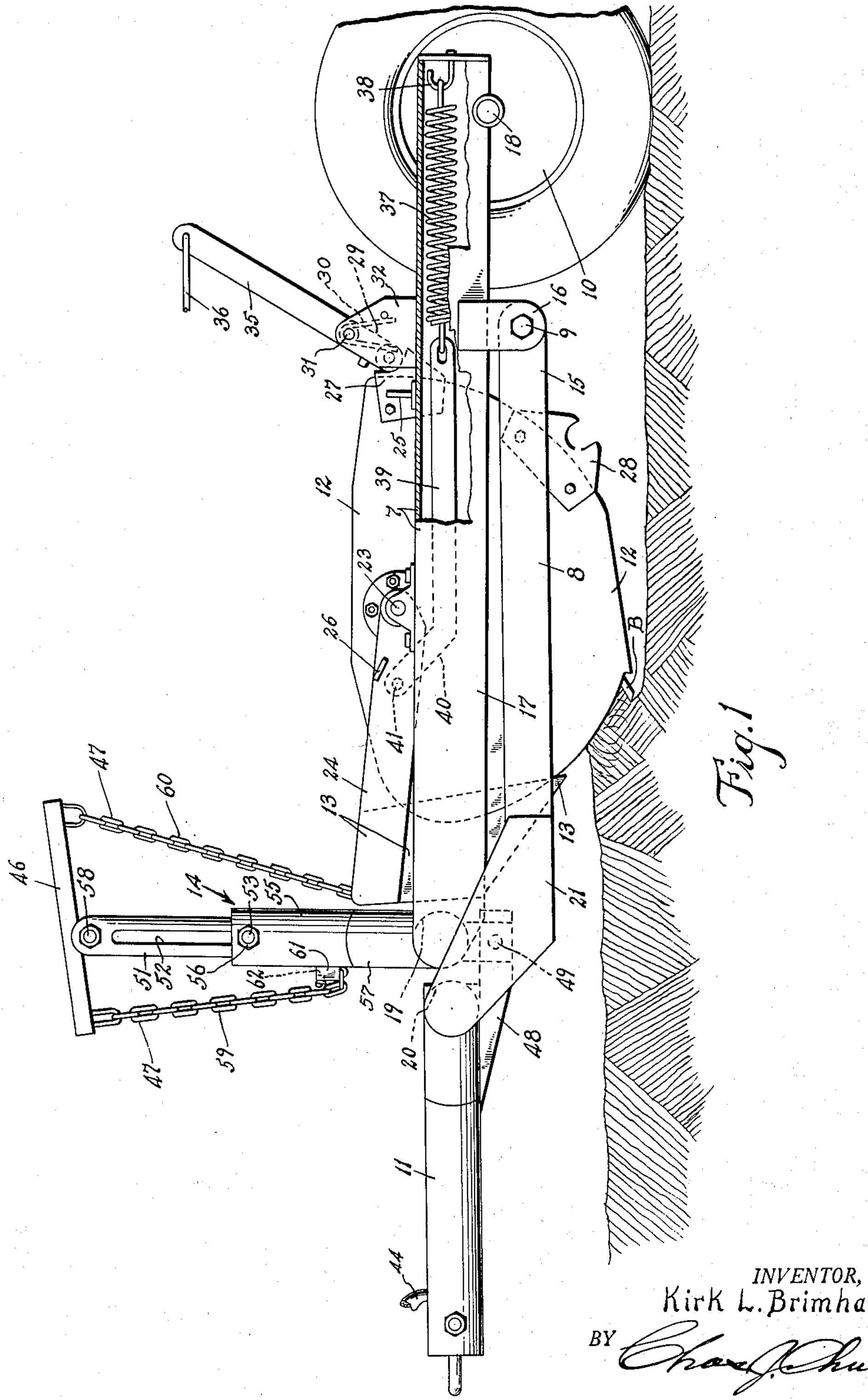
Fig. 1 is a fragmentary side elevational view of a scraper embodying the present invention, as shown in loading position.

As shown in the drawings, a scraper embodying this invention generally includes a vehicular or bowl-carrying frame 7, a draft frame 8 pivotally connected as at 9 to the frame 7, wheels 10 connected with and supporting the rear end of frame 7, a draw bar 11 on the draft frame for connecting the scraper with a tractor, not shown, a bowl 12 tiltably supported on the frame 7, an apron 13 operable on the frame 7 for opening and closing the bowl; and a combined means 14 for effecting relative movement of the frames 7 and 8 and disposing the apron in bowl-closing and bowl-opening positions.

The frames 7 and 8 comprise an articulate, sectional main frame and as here shown the bowl carrying frame is disposed above the draft frame 8, with the rear ends of the side members 15 of frame 8 connected by means of the pivots 9 to ears or lugs 16 depending from points intermediate the ends of the side members 17 of the frame 7. These points preferably are between the rear of the bowl 12 and the axles 18 on which the wheels 10 are mounted.

Frame 7 is substantially U-shaped with straight side members 17 joined at the front ends by means of a tubular end member 19 welded in place in the usual manner.

The frame 8 is similarly formed with its straight side members 15 joined at their forward ends by means of a tubular end member 20 disposed between angular plates 21, welded to the member 20 and side members and extending upwardly and forwardly from the side members whereby the end member 20 is offset above the side members 15 and forwardly of end member 19 of the upper frame 7 as shown in Fig. 1. In this connection it should be noted that the side plates 21 are offset outwardly from the plane of the outer faces of the side members 17 of the upper frame 7 so that when the latter is disposed in the substantially horizontal position shown in Figs. 1, 4, and 5 for disposing the bowl 12 in loading, dumping or other ground-contacting position, portions of the free ends of the side members 17 of frame 7 are disposed opposite the inner sides of the plates 21 (see Fig. 5) which latter act as stops or abutments to prevent lateral displacement of the frames. In other words, the frame 7 fits within frame 8 when the bowl is in contact with the ground and the two frames are substantially parallel and horizontally disposed at this time. This arrangement is important as the "interlock" of the frame makes it possible to make sharp turns with the scraper while loading, dumping or spreading, without causing relative lateral displacement of the frame and consequent damage of the scraper. The parallel and horizontal disposition of the frames brings them substantially in line with the draw bar 11 so that the line of draft is substantially through the horizontal central plane of the scraper intersecting the axis of the wheels 10. This makes the pulling of the scraper easier and subject to better control from the tractor and also gives the scraper a low center of gravity and desired stability.

The bowl 12 is of the more or less standard construction used in scrapers of this type as is the apron 13, both being of the same construction and arrangement as shown in my U. S. Letters Patent No. 2,445,260 issued July 13, 1948.

A common pivot means 23 is provided atop the side members 17 of frame 7 approximately centrally of the ends of the side members, for tiltably supporting the bowl and pivoting the rear ends of the apron supporting arms 24.

Figure 2:
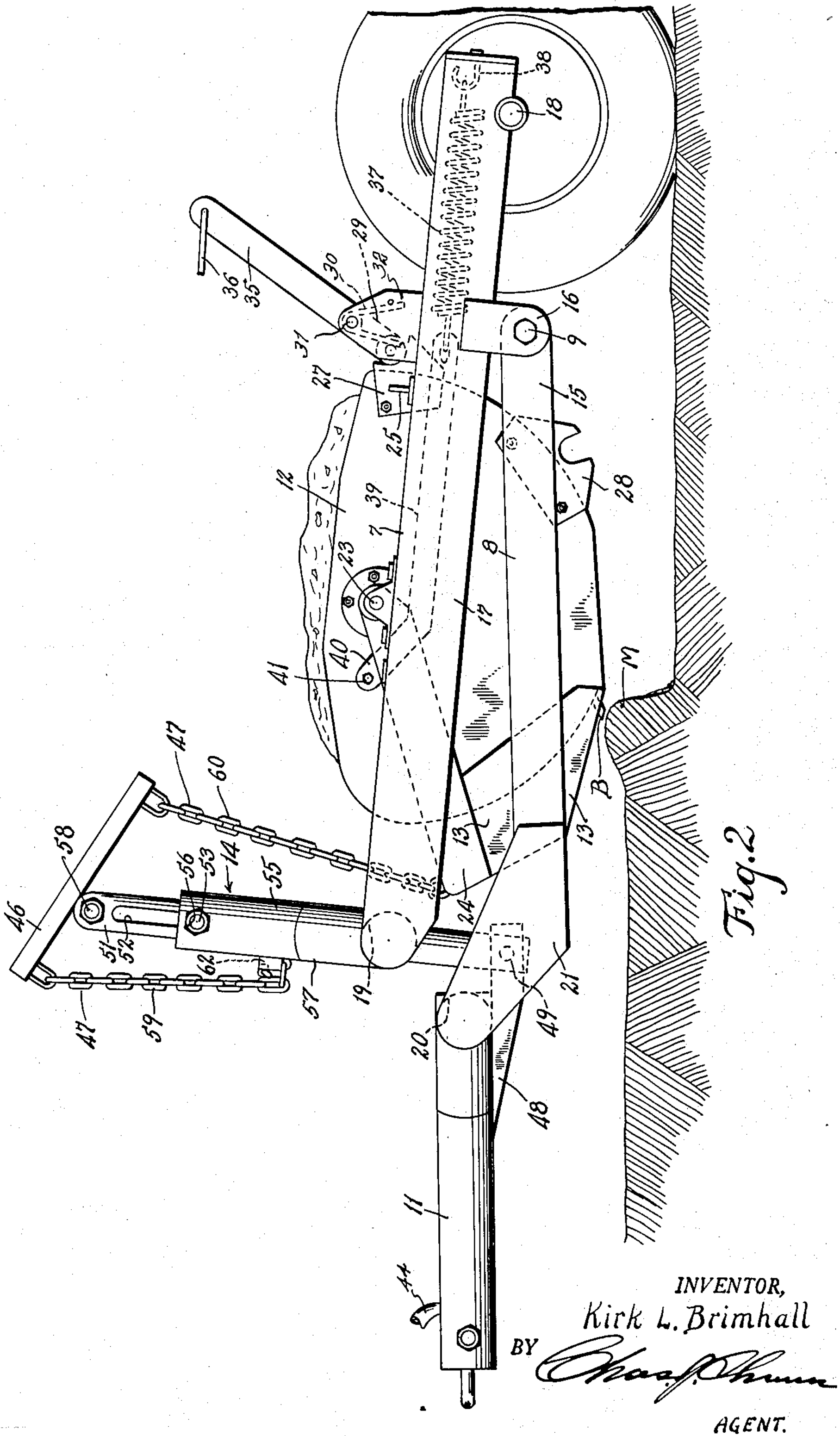
Fig. 2 is a side elevation of the scraper as it would appear while being moved from loading position into carrying position.
Figure 3:
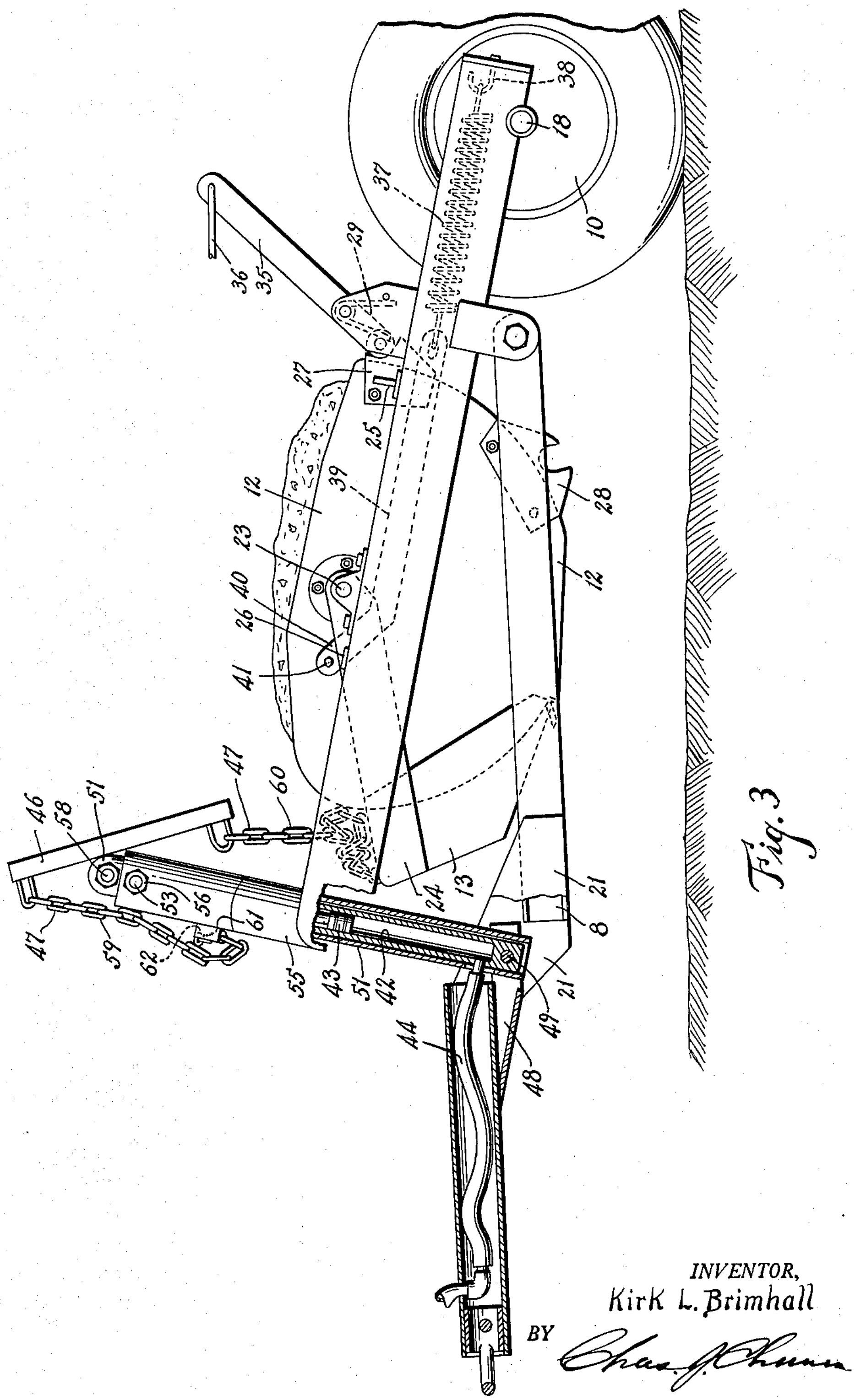
Fig. 3 is a part sectional, part side elevational view of the scraper as it would appear in carrying position.

Stop members 25 on the sides of the bowl 12 are disposed for contact with the side members 17 of frame 7 for limiting the tilting of the bowl 12 to loading and carrying positions shown in Figs. 1, 2 and 3.

Stop members 26 on the apron arms 24 are disposed for contact with the side members 17 of frame 7 for limiting the downward movement of the apron such that it will positively close the bowl as shown in Figs. 2 and 3.

Figure 4:
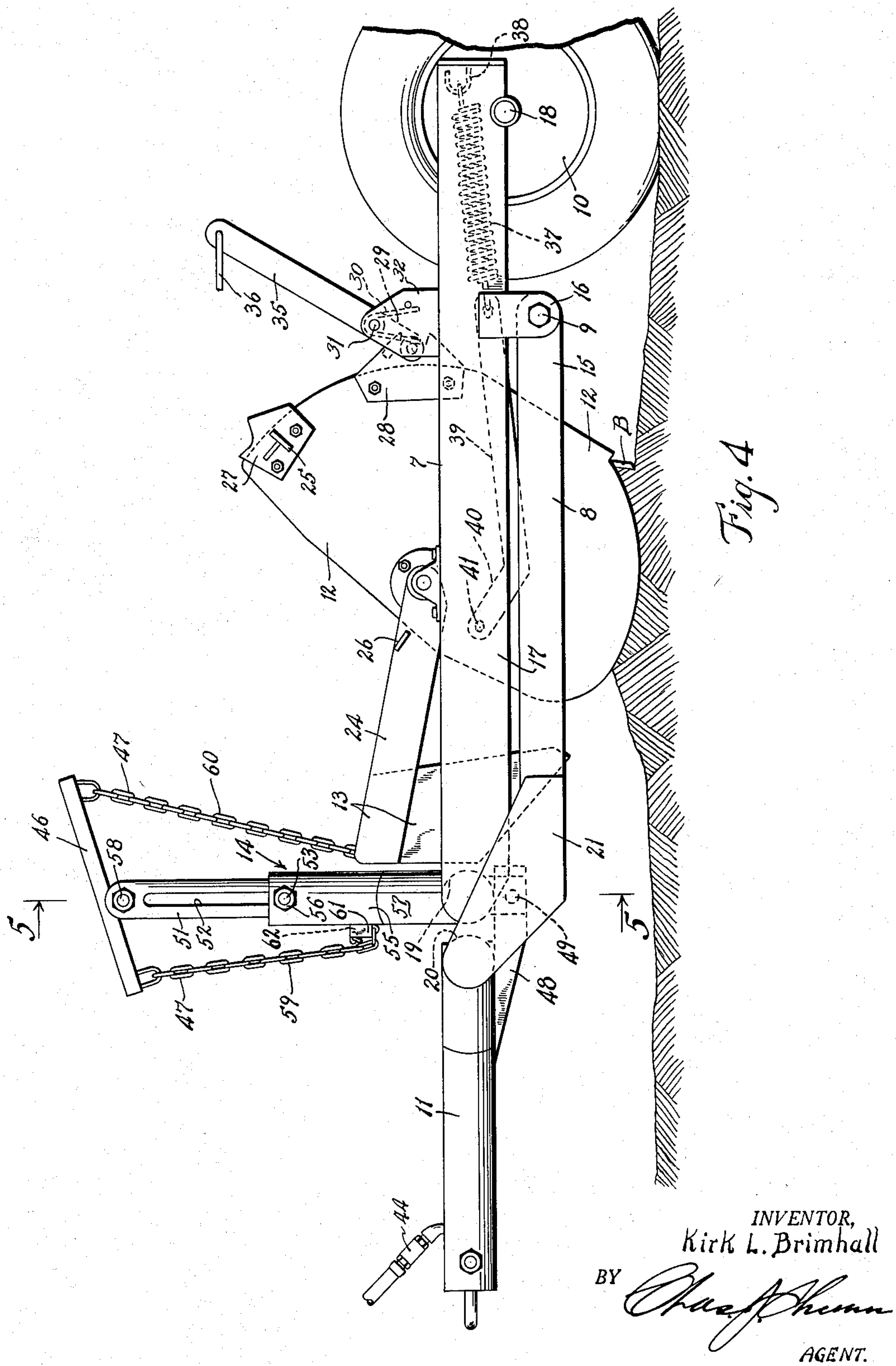
Fig. 4 is side elevational view of the scraper as it would appear in position for dumping and spreading.
Figure 6:
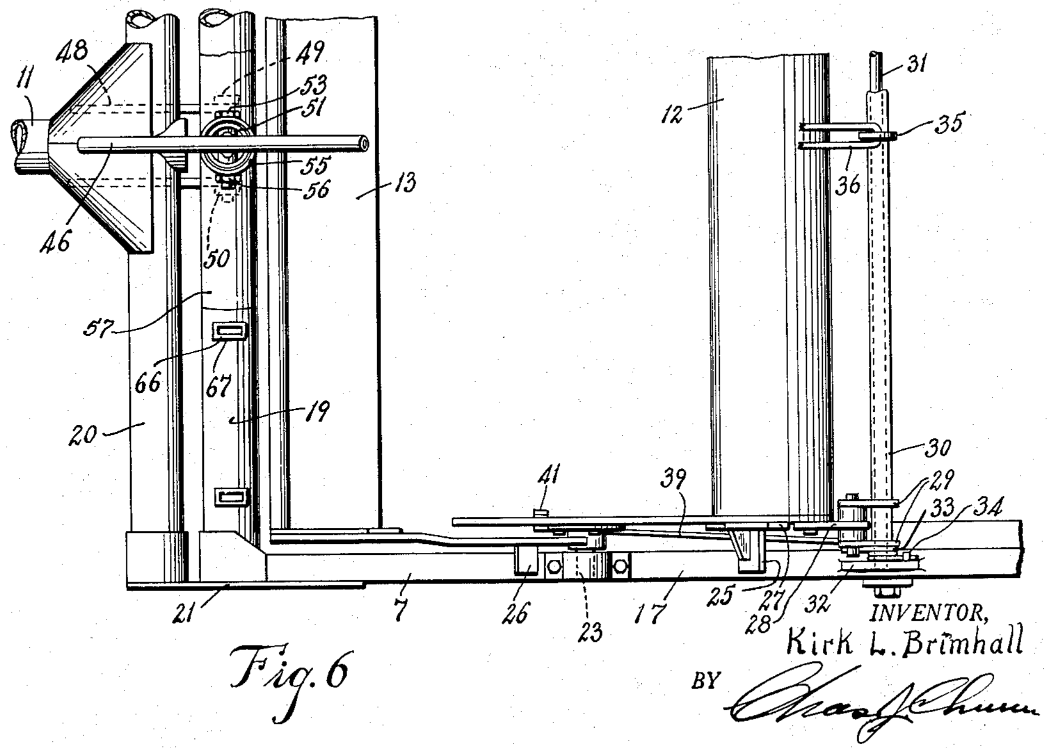
Fig. 6 is a fragmentary top plan view of the scraper in the position shown in Fig. 4.

A latch means is provided for holding the bowl in the loading, carrying and dumping positions shown in Figs. 1, 3 and 4 respectively. This means as here shown generally includes latch plates 27 and 28 on opposite sides of the bowl and a pair of spring loaded latch arms 29 for cooperation with the latch plates. The latch arms are carried by a tubular shaft 30 mounted as shown in Fig. 6, to turn on a rod 31 fixed to ears 32 on the side members 17 of the bowl-carrying frame 7. Springs 33 coiled around the shaft 30 with their ends contacting the arms 29 and lugs 34 on the ears 31 (see Fig. 6) operate to urge the arms into latching contact with the latch plates 27 and 28.

The latch arms 29 are moved out of latching position, that is, are moved out with engagement of the plates 27 and 28 by means of a crank arm 35 fixed on the shaft 30 and operated by means of a rope or other flexible element 36 leading from the crank arm to a point accessible to the driver of the tractor. On pulling the element 36, the crank arm turns the shaft 30 so that the arms 29 are moved out of latching position. On release of the element 36, the springs return the arms to position in which they will ride on the edges of the plates 27 and 28 and snap into latching engagement with said plates automatically when the bowl is disposed in its loading, carrying or dumping positions.

As a means for assisting in the tilting of the bowl into the dumping position shown in Fig. 4, and cushioning the return of the bowl to loading position, retractile springs 37 are connected as at 38 to the rear ends of the side members 17 of the frame 7 and to links 39 which extend angularly beneath the bowl pivot means and are provided with upwardly bent end portions 40 which are pivoted at 41 to the sides of the bowl at points forwardly of and slightly above the pivot means of the bowl. As the rear portions of the side member 17 are channel shaped and wider than the remainder thereof, the springs 37 are mounted therein and protected thereby as will be apparent from Fig. 1. The links 39 for the most part are spaced inwardly from the side members 17 and the end portions 40 are likewise inwardly spaced from the apron arms 24 as seen in Fig. 6, whereby relative movements of the links, bowl and apron arm are afforded without interference.

The combined means 14 for effecting relative movement of the frames 7 and 8 and disposing the apron 13 in proper position to open and close the bowl 12, as here shown, includes a hydraulic cylinder 42 operatively connected to one of said frames with the associated piston 43 operatively connected to the other frame. Pressure fluid is supplied from the tractor, not shown, through a hose line 44 (see Fig. 3) leading to the cylinder and in this instance the line is partly enclosed in the draw bar 11, which is tubular. This line also serves to relieve the fluid from the cylinder back to the tractor and it is not thought to be necessary to further describe the method of operating the hydraulic cylinder-piston unit, as in most tractors now used in connection with scrapers, a hydraulic system is provided under control of the driver, and it is a common practice to tap this system for operation of hydraulically responsive mechanism on scrapers and the like.

With the hydraulic cylinder connected to one frame and the piston connected to the other frame, relative movement of said frames may be effected at will by the operator of the tractor. Accordingly there is provided in association with these relatively movable frames, a lever 46 and link means 47, the latter connecting the lever with the cylinder housing and the apron unit respectively, whereby the apron will be disposed in open and closed positions responsive to the operation of the piston and cylinder unit and the consequent movement of one of the frames relative to the other. The link and lever arrangement is such that the apron will close the bowl substantially simultaneously with the raising of the bowl from loading to carrying position, and that the apron will raise quickly to a height fully opening the bowl before the latter commences to dump.

As here shown a particular construction and arrangement of the hydraulic cylinder unit and the associated lever and link means is provided and includes the anchoring of the lower end of the cylinder 42 between opposed arms 48 welded to the under side of the draw bar 11 and extending beneath the tubular end members 19 and 20 of the frames. A bolt 49 passed through the arms 48 and the lower end of the cylinder and having a nut 50 turned thereon, secures the cylinder to said arms for a slight pivotal movement on the bolt as is apparent from Fig. 5.

Figure 5:
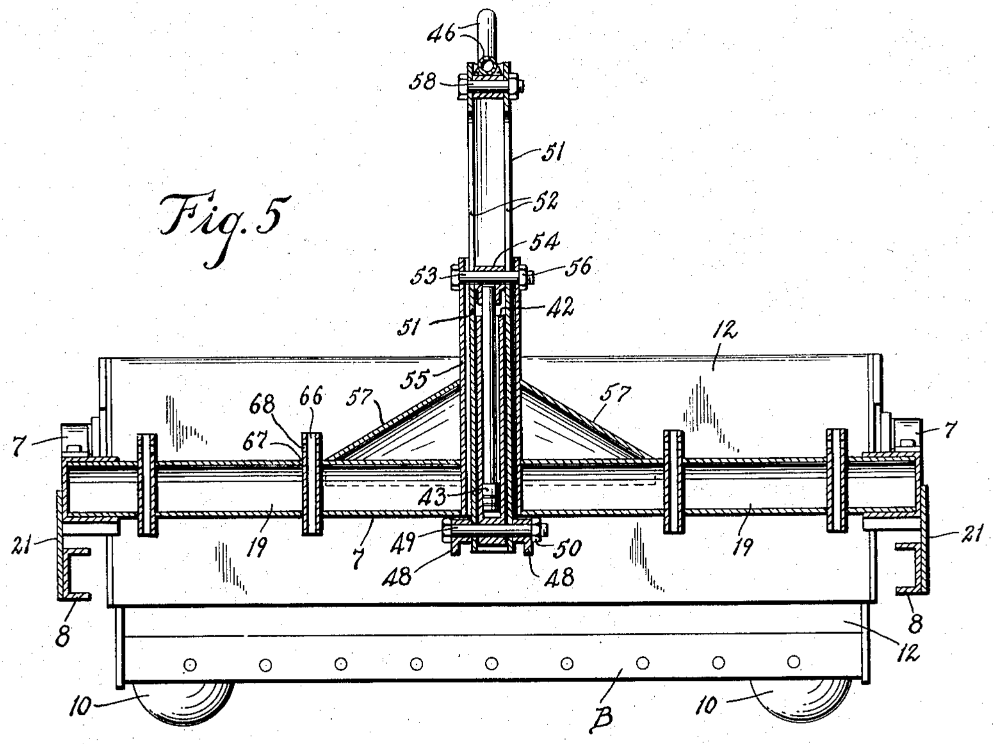
Fig. 5 is a vertical sectional view taken on the line 5—5 of Fig. 4.

A tubular post 51 telescopes the cylinder 43 as a housing therefor and is secured in place by means of the bolt 49 shown in Fig. 5. This post extends above the cylinder 42 and is provided with longitudinal slots 52 in the upper portion thereof. A bolt 53 is extended through said slots and slidable vertically therein. The bolt 53 is passed through a sleeve 54 fixed on the piston 43 within the post 51 so that it will be effectively guided up and down.

An upstanding tubular housing or sleeve 55 surrounds the post 51 and is vertically movable relative thereto being connected at its upper end to the piston 43 by means of the bolt 53 on which latter a nut 56 is applied to hold the bolt in place. The lower end of the housing or sleeve 55 is fixed to the bowl-carrying frame 7 so that as the piston 43 and housing 51 are moved up and down the frame 7 will be moved correspondingly relative to the draft frame 8.

In this connection it should be noted that the tubular end member 19 on the frame 7 is made in two pieces welded to opposite sides of the upright tubular housing or sleeve 55 as shown in Fig. 5. Thus the cylinder 42 and post 51 are extended through the housing and connected as previously described to the opposed arms 48 welded to the draw bar 11, or in other words to the frame 8 at a point below the end member 19 and the housing or sleeve 55.

As a means for reinforcing the front end of the frame 7 and the upright hydraulic unit thereon, like reinforcing members or webs 57 are welded to the top of the end member 19 and to opposite sides of the housing or sleeve 55 as best shown in Fig. 5. These members 57 abut on vertical edges thereof and are welded together so as to form a somewhat conical hood surrounding the housing 55 as shown in Figs. 5 and 6. With this construction the hydraulic cylinder unit is effectively reinforced and the front or free end of the bowl supporting frame 7 is made desirably strong and rigid. Fig. 5 shows how the front end of upper frame lies opposite the inner sides of the plates 21 on the frame 8 when the bowl is in ground-contacting position, so that sharp turns of the scraper may be made without causing relative lateral displacement of the frames and consequent damage thereof.

The lever 46 as here shown is fulcrumed between its ends on a bolt 58 extended through the upper end of the post 51, with the longer arm of the lever extending toward the rear of the scraper.

In the present embodiment of this invention, the link means 47 includes two chains 59 and 60. The chain 59 is coupled at one end to the forward end of the lever 46 and depends therefrom for detachable connection with a tubular keeper or eye 61 fixed on the upright sleeve 55, thus in effect linking the lever to the bowl-carrying frame 7. The keeper 61 is slotted at the top as at 62 so that after the chain 59 is threaded upwardly through the keeper, one of the links may be fitted edgewise in the slot to fix the chain to the keeper. This arrangement makes it possible to adjust the linkage best to suit the particular scraper and the desired operation of the apron to suit different soil conditions.

The apron-linking chain 60 is coupled at one end to the rear end of the lever 46 and at its other end to the top of the apron 13.

When the bowl 12 is in loading position as shown in Fig. 1 the chain 60 supports the apron in a raised position such that the bowl 12 is well open and the dirt will be scooped into the bowl instead of being rolled in front of the apron as would be the case if the apron had not been raised the extent made possible by the means as here provided.

When it is desired to discontinue the loading operation, the operator of the tractor manipulates the hydraulic control means thereon so as to apply pressure fluid to the cylinder 42 to raise the piston 43 and move the sleeve 55 upwardly relative to the post 51. As the sleeve 55 is fixed to the frame 7, the latter is lifted relative to frame 8 and lifts the bowl out of loading position. When the sleeve 55 is raised the chain 59 slackens and allows the lever to rock so that the rear end thereof is moved downwardly under the weight of the apron 13 which lowers quickly toward and closes the bowl so that no appreciable amount of dirt will drop between the apron and bowl during the lifting of the bowl into carrying position. As an example, with reference to Fig. 2 which shows the bowl with the blade B just clear of the ground, the apron is shown as fully closing the bowl but in fact, the apron will have reached this fully closed position and substantially at the time the blade B clears the small dirt mound M which usually is formed ahead of the blade. During the time the apron is nearing closed position, if a small amount of the mound M is present between the opposed edges of the apron and the blade, this mound will obstruct gravitational discharge of any appreciable part of the load through the space between the bowl and the apron, but will not prevent the relatively heavy apron from cutting through the dirt and reaching closed position. The leverage gain afforded by reason of the arrangement of the lever 46 and chain links 59 and 60 is such that the apron lowers at a faster rate than the frame 7 and bowl are moved upwardly, thus providing for a quick full closing movement of the apron before the bowl has moved into a position in which, otherwise, some of the load would spill between the bowl and the apron. The bowl in being raised at the time the apron is closing, assures that the desired quick closing movement of the apron will be effected even though the apron is being bodily lifted somewhat while the frame 7 and bowl are being raised. Fig. 3 shows the bowl fully raised to load carrying position as affected by continued operation of the hydraulic system until the piston 43 reaches the top of its stroke, at which time the chain 59 and 60 are slack and the lever 46 is nearer the vertical position.

When the bowl is latched in the loading position shown in Fig. 1 it may be moved into the elevated positions shown in Figs. 2 and 3 without releasing the latch means.

To dump the load from carrying position shown in Fig. 3, the tractor operator pulls on the flexible element 36 and retracts the latch arms 29 thereby releasing the bowl and at the same time manipulating the control member of the hydraulic system on the tractor so as to relieve the fluid from the cylinder 42 thereby lowering the frame 7 so that the blade B contacts the ground. A full tilting of the bowl on its pivotal mounting, into position shown in Fig. 4 is effected by moving the scraper forwardly as the blade B encounters the ground and when the bowl is thus tilted the latch means automatically operates to hold the bowl in the dumping position. This position of the bowl is also used in spreading the dirt. The springs 37 assist in this tilting of the bowl into dumping position.

As the bowl is being lowered and tilted to its dumping position the slack of the chains 59 and 60 is taken up due to the descent of frame 7 and apron 13 as the piston 43 descends in the cylinder 42 and likewise moves the sleeve 55 downwardly. As soon as the slack of chain 59 is taken up, the further descent of the sleeve 55 causes the chain to pull on the lever and rock it so as to lift the apron by means of the chain 60. This rocking of the lever 46 resulting in the lifting of the apron, takes place quickly during the time the frame 7 moves from elevated position shown in Fig. 2, into the lowered position shown in Fig. 4. The leverage afforded by the arrangement of lever 46 and the chains 59 and 60 is such that the apron is quickly raised to a considerable height allowing free discharge of the load being dumped and preventing the apron from pushing the dirt ahead of it in spreading the dirt while dumping.

The bowl is placed in loading position, after a dumping operation, by releasing the bowl latch means and lifting the frame 7 and the bowl until the blade B clears the ground. The bowl will then swing back into loading position gravitationally due to the rear part thereof being heavier. In so moving, the bowl is cushioned by the action of the springs 37 and links 13, to prevent slamming and possible damage of the latch means, which latter automatically latches the bowl in loading position.

Having been lifted to allow the bowl to swing back to loading position, the frame 7 is again lowered in the manner hereinbefore described, to dispose the blade B in contact with the ground for loading the bowl and in this lowering movement of the bowl, the lever 46 and associated elements operate to quickly raise the apron to the high level to prevent interference, as hereinbefore stated, with a proper loading operation.

Figures 7, 8, 10:
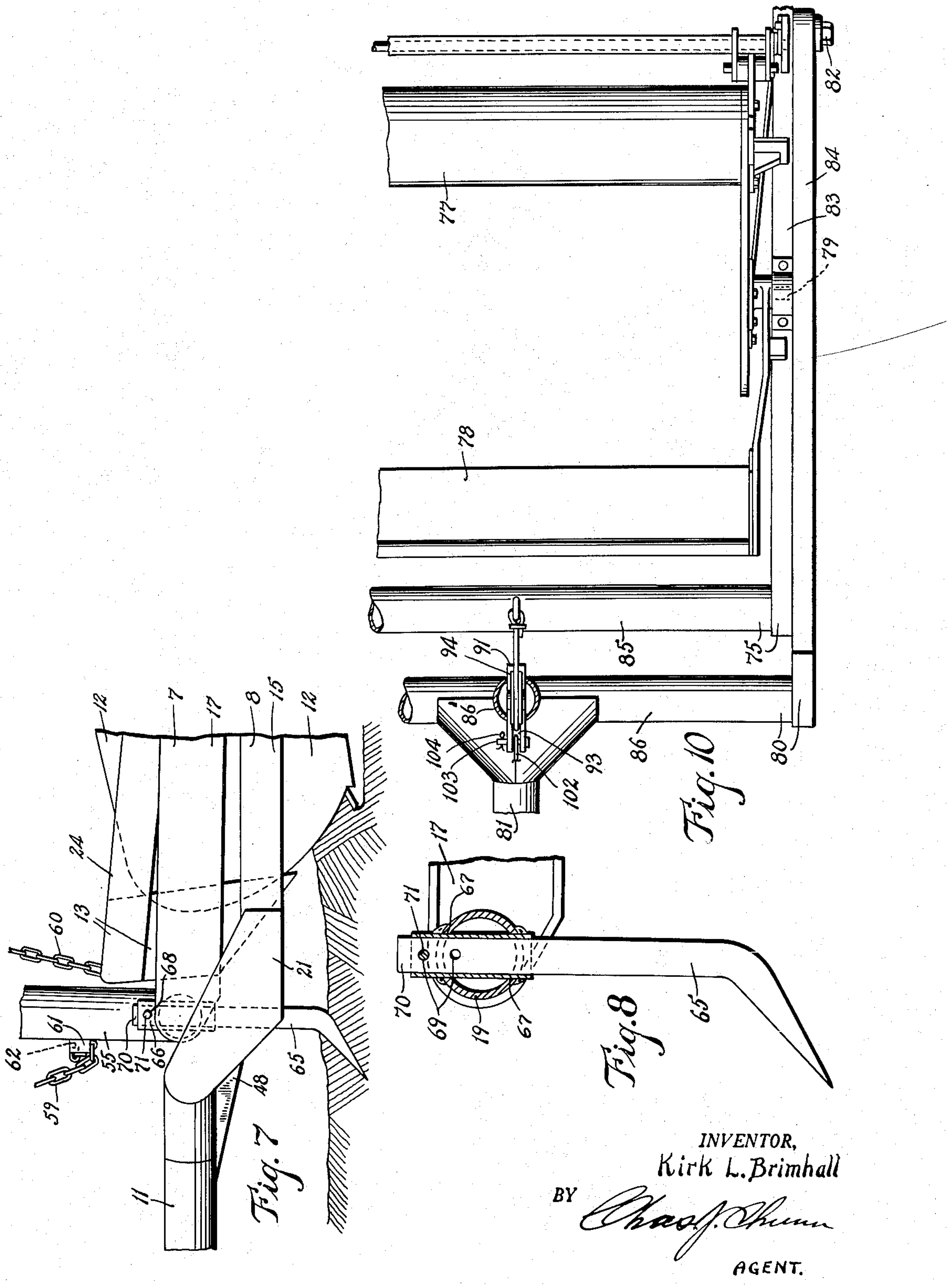
Fig. 7 is a fragmentary side elevational view showing scarifying teeth mounted on the bowl-carrying frame of the scraper.
Fig. 8 is a vertical sectional view showing one means of removably and adjustably mounting the scarifying teeth on the scraper.
Fig. 10 is a sectional view of the mechanism for raising and lowering the bowl-carrying frame and the apron, also showing the relative arrangement of the draft frame and bowl carrying frame, being taken on line 10—10 of Fig. 9.

An important provision of this invention is that the scraper is adapted for an advantageous use of scarifying teeth 65 as shown in Figs. 7 and 8. These teeth, two or more in number, are detachably and adjustably mounted in open-ended sockets 66 which extend through openings 67 (see Figs. 5 and 6) cut through the top and bottom of the end member 19 of frame 7. These sockets are suitably welded to the member 19 to secure them in place and have vertically spaced holes 68 (see Figs. 5 and 6) therein for registration with similar holes 69 in the shanks 70 of the teeth. Bolts 71 or the like are inserted through selected holes 68 and 69 to secure the teeth in the desired adjusted position depending on the depth it is desired to have the teeth penetrate the ground.

As shown in Fig. 7 the scarifying operation may be carried out when the bowl 12 is disposed in its loading or spreading positions so that in the case of loading, the ground is loosened in advance of the bowl which readily scoops up the soil thus loosened. If desired the bowl may be turned to a position in which the blade B clears the ground and the bowl then propped up in any suitable manner, whereby a scarifying operation only may be carried out. When the teeth are in ground-contacting or scarifying position while loading or spreading, with the bowl on ground which slopes across the line of travel of the scraper, the teeth will prevent objectionable sidewise sliding of the scraper which otherwise often takes place. Thus it is apparent the use of the teeth increases the efficiency of the scraper while loading or spreading with the bowl.

When the frame 7 is raised to dispose the bowl in carrying position the teeth are likewise raised and disposed in out-of-the-way position. If the teeth are of such length and so adjusted in the sockets 66 that they will dig into the ground before the bowl is disposed in loading or spreading position, it is apparent a scarifying operation may be carried out independently of the loading or spreading operation of the bowl, by lowering the frame 7 accordingly. The depth of penetration of the teeth is therefore subject to variation by the vertical adjustments thereof, the length of the teeth and the positioning of the frame 7 on which the teeth are mounted.

The sockets 66 remain on the member 19 after the teeth 65 are removed and serve as a convenient means for attaching any ground-engaging or other implement, not shown, which may be desired or subject to use on this scraper.

Figure 9:
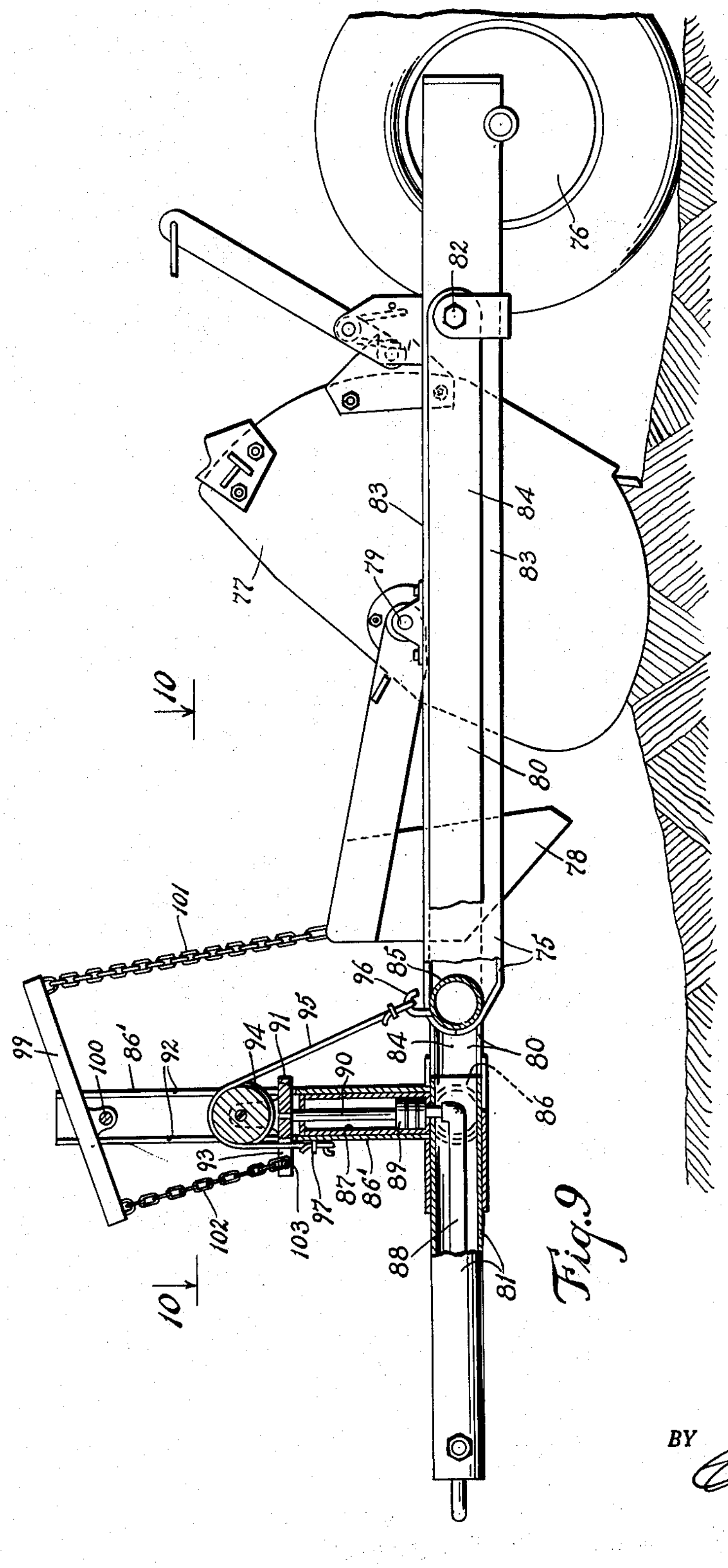
Fig. 9 is a fragmentary view partly in side elevation and partly in vertical section of a modified form of this invention.

As shown in Figs. 9 and 10 a modified form of scraper embodying this invention includes a bowl-carrying frame 75 corresponding in construction to frame 7 shown in Figs. 1 through 6, and being supported by wheels 76. A bowl 77 and an apron 78 are pivoted as at 79 on the frame 75 in the same manner as in the first described form of my invention.

A draft frame 80 having a draw bar 81 and corresponding in construction to the frame 8 is pivotally joined at its rear ends as at 82 to the frame 75, but in a different relation to frame 75 compared to the arrangement shown in Figs. 1 through 6. In this instance the draft frame encompasses and extends around the bowl frame 75 so that the latter is within the former. The side members 83 of frame 75 lie in opposed relation to the inner sides of the side members 84 of draft frame 80, whereas the end member 85 of the inner frame 75 is disposed in rearwardly spaced relation to the end member 86 of the draft frame 80.

When the bowl 77 is in loading, spreading and dumping positions, the side members 83 of the bowl-carrying frame 75 from end to end are opposed to the side members 84 of frame 80, thereby preventing relative lateral displacement of the frames and providing desired rigidity and stability of the scraper as a whole. When the bowl is in carrying position, the front end of the frame 75 is raised above the side members 84 of frame 80 but the side members 83 at points between their ends and toward their rear ends are opposed to the side members 84 of frame 80 and relative lateral movement and side sway of the bowl-carrying frame is prevented. This arrangement of the draft and bowl-carrying frames makes the scraper stronger and more durable and efficient in operation.

The means for raising and lowering of the bowl-carrying frame 75 and operating the apron 78 is similar to the corresponding means in the form of my invention shown in Figs. 1 through 6 in that it includes an upright tubular post 86′ secured rigidly at its lower end to the top of the end member 86 of frame 80 and a hydraulic cylinder 87 likewise rigidly fixed at its lower end to the end member 86 and disposed within the post. A hydraulic fluid line 88 leads to the bottom of the cylinder 87 for operating a piston 89 therein. The top of the piston rod 90 is fixed to a guide member 91 slidably guided in slots 92 in opposed sides of the upper portion of the post 86′. This guide member 91 extends outwardly from one side of the post and is slotted as at 93 in the extended end thereof.

A pulley 94 is mounted on the guide member 91 and extends through the opposed slots 92 which latter are wider than the thickness of the pulley so that the pulley is spaced from contact with the post and so held by reason of the thicker guide member having a sliding fit in the slots 92.

A cable 95 is extended over the pulley 94 and has one end fixed as at 96 to the end member 85 of the bowl-carrying frame 75 whereas the other end of the cable is fixed to the post 86′ by means of a clamp 97 which makes it possible to vary the effective length of the cable best to provide the desired lifting and lowering of the frame 75.

That part of the cable 95 extending from the pulley 94 to the point of fixing the cable to the post 86′ runs freely through the slot 93 in the extended end of the guide member 91.

It will now be apparent that when the piston 89 is elevated by hydraulic fluid supplied to cylinder 87 from the tractor under control of the operator, the guide member 91 and pulley 94 move upwardly and the cable 95 operates to raise the frame 75 and the bowl carried thereby. On release of the pressure fluid, the piston and pulley will descend under the weight of the frame 75, to lower the bowl into its operative ground-contacting positions. This movement of frame 75 also is under direct control of the operator of the tractor.

A lever 99 is pivoted between its ends as at 100 on the upper end of the post 86′ and a chain link 101 is connected to one end thereof and to the apron 78, whereas another chain 102 is connected to the other end of the lever and to the slotted and extended end of the guide member 91 by means of fastenings 103 and 104 affording adjustable fastening of the chain whereby the effective length thereof may be varied to regulate the opening and closing movement of the apron.

It will now be seen that as the guide member 91 is moved upwardly with the pulley 94 to raise the frame 75 and lift the bowl, the chain 102 will slacken and allow the lever to rock so that the apron will close before the bowl is raised out of loading position, in the manner as takes place in the form of this invention shown in Figs. 1 through 6 hereof.

When the frame 75 and bowl are lowered, the weight of the frame and parts thereon move the guide member 91 downwardly, which takes up the slack on the chain 102 and pulls on the lever 99 so that through the chain 101, the apron is raised to fully open the bowl for loading, in the same manner as described hereinbefore in connection with the form of my invention shown in Figs. 1 through 6.

In the modification shown in Figs. 9 and 10 scarifying teeth may be attached to the end member of frame 75 and used in the same manner as hereinbefore described.

One of the reasons that the scarifying teeth may be used with the scraper hereof is that the weight of the bowl-carrying frame and part carried thereby cause the teeth to be firmly held down in the ground during use thereof without the bouncing of the teeth up and down as is the case in implements which do not afford sufficient weight on the teeth.

Figure 11:
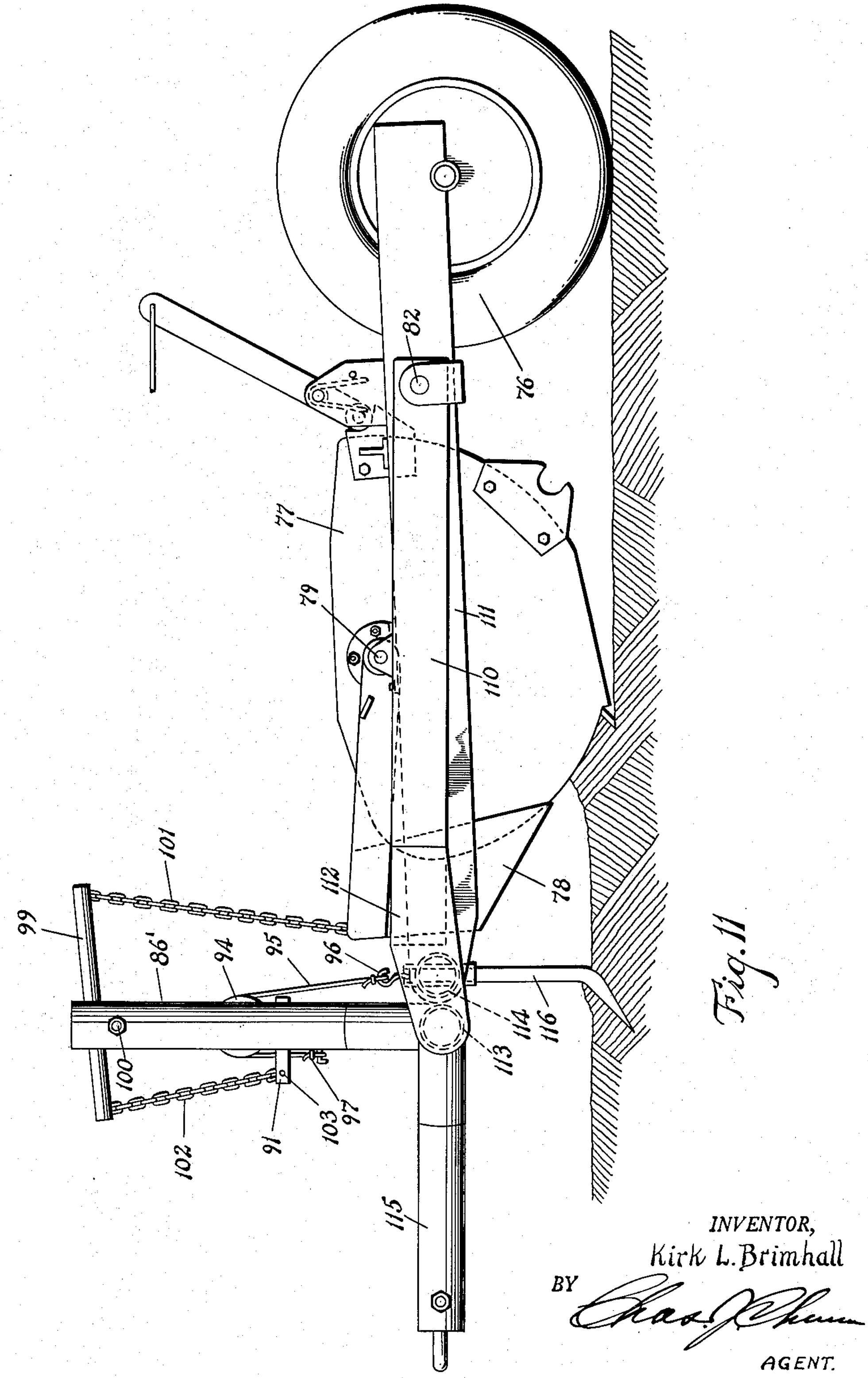
Fig. 11 is a fragmentary side elevational view of another modification of this invention.

Fig. 11 shows another modified form of scraper which is similar to the scraper shown in Figs. 9 and 10 in that the draft frame 110 is disposed so as to encompass the bowl-carrying frame 111. However the draft frame has angular side plates 112 welded thereto and extended forwardly and somewhat downwardly therefrom, and the end member 113 thereof is welded to and between said plates so as to be somewhat downwardly offset compared to the like member shown in Figs. 9 and 10. The end member 114 of the bowl-carrying frame 111 is closer to the end member 113 whereby the cable for lifting and lowering the bowl-carrying frame is more nearly vertical. In this connection it should be noted that the bowl-carrying frame and the apron are operated by the same means as shown in Figs. 9 and 10 and that the parts which correspond to the parts in Figs. 9 and 10 are identified by the same reference numerals.

The draft frame 110 is disposed above the bowl-carrying frame when the bowl is in loading position. Portions of the front ends of the sides of the bowl-carrying frame are opposite the side portions of the draft frame so as to prevent any relative lateral movement of said frames which might prove damaging.

The front end of the bowl-carrying frame moves in a path which intersects the draft frame, being above the draft frame when raised to dispose the bowl in carrying position and in part below it when lowered to dispose the bowl in loading position.

This form of the invention is adapted for use of ripper teeth 116 which are socketed in the end member 114 of the bowl-carrying frame in the same manner as shown in Fig. 8.

I claim:

1. In a hauling scraper, a bowl-carrying frame, a bowl thereon, a draft frame, means connecting said frames so that one frame may be raised and lowered relative to the other, wheels on one of said frames, an apron mounted on one of said frames for movement to open and close the bowl, an upstanding post fixed to one of said frames and extending above the other frame, a lever fulcrumed between its ends on said post above said frames, a link connecting one end of said lever with said apron for moving the apron into positions for opening and closing the bowl on the rocking of said lever, a slide member on said post below said lever, a flexible element connecting said slide member with the other end of said lever for effecting and controlling movement of said lever upon the sliding movement of said slide member, and raising and lowering means associated with said slide member, post and said frames for raising and lowering the bowl-carrying frame and at the same time moving said slide member so as to rock said lever for disposing the apron to open and close the bowl.

2. In a hauling scraper, a bowl-carrying frame, a bowl thereon, a draft frame, means connecting said frames so that one frame may be raised and lowered relative to the other, wheels on one of said frames, an apron mounted on one of said frames for movement to open and close the bowl, an upstanding post fixed to one of said frames and extending above the other frame, a lever fulcrumed between its ends on said post above said frames, a link connecting one end of said lever with said apron for moving the apron into positions for opening and closing the bowl on the rocking of said lever, a slide member on said post below said lever, a flexible element connecting said slide member with the other end of said lever for effecting and controlling movement of said lever upon the sliding movement of said slide member, a hydraulic cylinder fixed to one frame, a piston in said cylinder connected with said slide member, a connection between the slide member and the bowl-carrying frame whereby the latter will be raised and lowered on the sliding movement of said slide member.

3. In a hauling scraper, a bowl-carrying frame, a bowl thereon, a draft frame, means connecting said frames so that one frame may be raised and lowered relative to the other, wheels on one of said frames, an apron mounted on one of said frames for movement to open and close the bowl, an upstanding post fixed to one of said frames and extending above the other frame, a lever fulcrumed between its ends on said post above said frames, a link connecting one end of said lever with said apron for moving the apron into positions for opening and closing the bowl on the rocking of said lever, a slide member on said post below said lever, a flexible element connecting said slide member with the other end of said lever for effecting and controlling movement of said lever upon the sliding movement of said slide member, said post being tubular, a hydraulic cylinder within said post being fixed to one of said frames, a piston in said cylinder, a piston rod connected with said piston and extending upwardly in said post, a connection between said piston rod and said slide member for sliding the latter on movement of said rod for raising and lowering the bowl-carrying frame and disposing the apron in position to open and close the bowl upon operation of said piston and cylinder unit.

4. In a hauling scraper having a draft frame, a bowl-carrying frame, means connecting said frames so that the bowl-carrying frame may be raised and lowered, a bowl on said bowl-carrying frame, an apron movable on said bowl-carrying frame for opening and closing the bowl, an upright tubular post fixed at its lower end to said draft frame, a hydraulic cylinder within said post fixed at its lower end to said draft frame, a piston operable in said cylinder, a piston rod connected to said piston and extending above said cylinder within said post, a tubular slide member fixed at its lower end to said bowl-carrying frame and slidably supported on said post, means connecting said piston rod with said slide member for raising and lowering the slide member and the bowl-supporting frame upon corresponding movement of said piston rod, a lever fulcrumed between its ends on said post at a point above said slide member, a flexible element connecting one end of said lever with said apron for raising and lowering the apron upon rocking of said lever, and another flexible element connecting the other end of said lever with said slide member for effecting and controlling the rocking of said lever upon the sliding movement of said slide member.

5. In a hauling scraper having a draft frame, a bowl-carrying frame, means connecting said frames so that the bowl-carrying frame may be raised and lowered, a bowl on said bowl-carrying frame, an apron movable on said bowl-carrying frame for opening and closing the bowl, an upright tubular post fixed at its lower end to said draft frame, a hydraulic cylinder within said post fixed at its lower end to said draft frame, a piston operable in said cylinder, a piston rod connected to said piston and extending above said cylinder within said post, a slide member fixed at its lower end to said bowl-carrying frame, said post having opposed slots, means slidable in said slots and connecting said piston rod with said slide member for raising and lowering the slide member and the bowl-supporting frame upon corresponding movement of said piston rod, a lever fulcrumed between its ends on said post at a point above said slide member, a flexible element connecting one end of said lever with said apron for raising and lowering the apron upon rocking of said lever, and another flexible element connecting the other end of said lever with said slide member for effecting and controlling the rocking of said lever upon the sliding movement of said slide member and means on said slide member for changing the effective length of one of said flexible elements to vary the opening and closing action of said apron.

6. In a hauling scraper, having a draft frame, a bowl-carrying frame, means connecting said frames so that the bowl-carrying frame may be raised and lowered, a bowl on said bowl-carrying frame, an apron movable on said bowl-carrying frame for opening and closing the bowl, an upright tubular post fixed at its lower end to said draft frame, a hydraulic cylinder within said post fixed at its lower end to said draft frame, a piston operable in said cylinder, a piston rod connected to said piston and extending above said cylinder within said post, said post having slots extending longitudinally thereof, a tubular slide member connected with said bowl-carrying frame and surrounding said post, a member slidable in said slots and connecting said slide member and piston rod for corresponding movement, a lever fulcrumed between its ends on said post above said slide member, and chains fixed to ends of said lever and connected with said slide member and said apron respectively.

7. In a hauling scraper having a bowl-carrying frame, a bowl thereon, an apron thereon, a draft frame and means pivotally connecting said frames for relative movement; the improvement which includes an upstanding tubular post fixed at its lower end to the draft frame, a hydraulic cylinder fixed to the draft frame, said cylinder being mounted within said post, a piston reciprocable in said cylinder, a piston rod operated by said piston, means of connection between said piston rod and said bowl-carrying frame for raising and lowering the bowl-carrying frame responsive to corresponding movement of said piston rod, a lever fulcrumed between its ends on said post, means connecting one end of said lever to said piston rod including a flexible element which pulls on the lever when the piston rod descends and slackens when the piston rod is raised, and another flexible element depending from the other end of said lever and connected with said apron.

8. In a hauling scraper, a bowl-carrying frame, wheels supporting the rear end of said frame, a bowl mounted at a point between the ends of said frame, a draft frame pivoted at its rear end on the bowl-carrying frame at a point rearwardly of said bowl, a draw bar at the front end of said draft frame, an apron mounted on said bowl-carrying frame, an upright tubular post fixed on said draft frame, a hydraulic cylinder in said post, a piston and piston rod in said cylinder, said post having vertical slots above said cylinder, a slide member connected to said piston rod and movable vertically in said slots, a pulley on said slide member movable vertically therewith in said slots, a cable having one end fixed to said post and its other end fixed to said apron, the intermediate portion of said cable extending over the top of said pulley whereby the cable will raise and lower the apron as the pulley is raised and lowered with said piston rod, a lever pivoted between its end on said post, a flexible element fixed at one end to said slide member and at its other end to one end of said lever, and another flexible element fixed at one end to said apron and at its other end to the other end of said lever.

References Cited in the file of this patent

UNITED STATES PATENTS

| | | |
|---|---|---|
| 871,976 | Whitney | Nov. 26, 1907 |
| 2,272,221 | Mork | Feb. 10, 1942 |
| 2,293,636 | Berner et al. | Aug. 18, 1942 |
| 2,311,639 | Click | Feb. 23, 1943 |
| 2,445,260 | Brimhall | July 13, 1948 |
| 2,581,073 | Brower | Jan. 1, 1952 |
| 2,624,960 | Schneckloth | Jan. 13, 1953 |